United States Patent [19]

Chenausky et al.

[11] 4,429,398
[45] Jan. 31, 1984

[54] TWIN WAVEGUIDE LASER

[75] Inventors: Peter P. Chenausky, Avon, Conn.; Robert J. Mongeon, East Longmeadow, Mass.; Erroll H. Drinkwater, Portland; Lanny M. Laughman, Bolton, both of Conn.

[73] Assignee: United Technologies Corporation, Hartford, Conn.

[21] Appl. No.: 348,565

[22] Filed: Feb. 12, 1982

[51] Int. Cl.³ .............................................. H01S 3/03
[52] U.S. Cl. ..................................... 372/64; 372/97; 372/82; 372/102; 372/93
[58] Field of Search ................... 372/97, 82, 64, 102, 372/93

[56] References Cited

U.S. PATENT DOCUMENTS

| 4,103,255 | 7/1978 | Schlossberg | 372/64 |
| 4,169,251 | 9/1979 | Laakmann | 372/64 |
| 4,241,319 | 12/1980 | Papayoanou | 372/97 |
| 4,352,188 | 9/1982 | Griffith | 372/84 |

Primary Examiner—William L. Sikes
Assistant Examiner—Leon Scott, Jr.
Attorney, Agent, or Firm—Eric W. Petraske

[57] ABSTRACT

An RF-discharge waveguide laser incorporates two or more waveguides sharing a common set of discharge electrodes. The device may be used to provide two lasers operating on the same or different frequencies, or a single laser with two waveguides contributing to the power output.

3 Claims, 4 Drawing Figures

TWIN WAVEGUIDE LASER

DESCRIPTION

The Government has rights in this invention pursuant to Contract No. DAAK80-79-C-0302 awarded by the Department of the Army.

1. Technical Field

The field of the invention is that of an RF-discharge waveguide laser.

2. Background Art

U.S. Pat. No. 4,241,319, issued on Dec. 23, 1980 discloses a waveguide laser having two parallel waveguides machined in a ceramic block. The two lasers are independently tuned by separate stark cells operated nearly at the breakdown voltage. The problem of causing both of the waveguide DC discharges to fire simultaneously is not discussed.

DISCLOSURE OF INVENTION

The invention relates to an RF-discharge waveguide laser having multiple waveguides sharing a common set of transverse discharge electrodes, so that the duplication and redundancy implied by separate electrode or power supplies for each waveguide is eliminated.

BEST MODE FOR CARRYING OUT THE INVENTION

Figure 1:
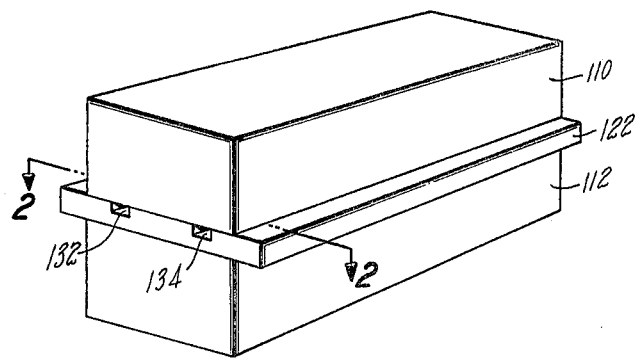
FIG. 1 illustrates the electrode and waveguide configuration of a laser constructed according to the invention.

In FIG. 1, electrodes 110 and 112 are separated by ceramic slab 122, into one surface of which waveguides 132 and 134 are machined. The material of slab 122 may be alumina or any other suitable ceramic material. Electrodes 110 and 112 are fed RF power from a conventional power source omitted from the illustration for simplicity. Typical mirrors and diffraction gratings appropriate for waveguide lasers are conventional in the art and are also omitted from the drawing for clarity.

Figure 2:
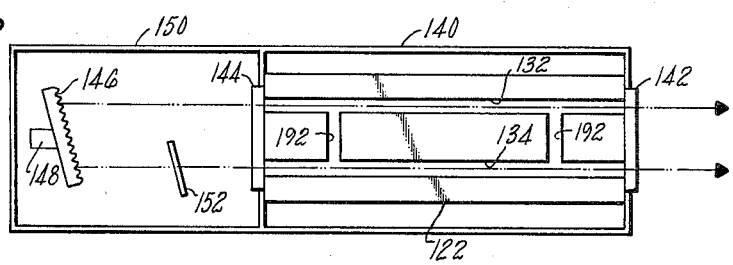
FIG. 2 illustrates a cross section of a pair of lasers sharing a common diffraction grating.

FIG. 2 illustrates a cross section taken through section 2—2 in FIG. 1 and also showing a diffraction grating and windows. Block 122 of FIG. 1 has attached to it window 144 and mirror 142, constructed of material appropriate for laser operation. The whole electrode construction is enclosed within box 140, a gas tight enclosure confining the gaseous gain medium. In this particular embodiment, the remainder of box 140 is filled with the same gaseous gain medium, such as $CO_2$, that is contained within the waveguides and suitable passages are machined in block 122 to permit circulation of the gas.

A plurality of passages 192 having cross sectional area comparable to the cross section of the discharge channel are formed in slab 122, connecting the two discharge passages. These connecting passages permit the discharge plasma to communicate between channels and thereby improve discharge stability. Since the passages are at a right angle to the path of the laser radiation, there is very little communication between optical cavities and systems in which the two cavities run at different frequencies are not adversely affected.

Enclosure 150 encloses and supports diffraction grating 146 mounted on piezoelectric transducer 148. The interior of enclosure 150 may be filled with a gas and pressure chosen for convenience. Grating 146 is sufficiently large to control the optical beams passing from waveguides 132 and 134 through window 144 and being reflected back from grating 146. Frequency adjuster 152 is a plate of transparent material oriented at Brewster's angle which changes the effective cavity length for waveguide 134 and thus changes the operating frequency of that waveguide. With frequency adjuster 152, waveguides 132 and 134 operate within the transition selected by grating 146, but at the frequency offset determined by the thickness of adjuster 152. Transducer 148 is controlled by conventional circuitry to maintain the cavity length of the two lasers at a predetermined amount to compensate for any thermal length variations. Control circuitry is conventional and is omitted from the diagram.

Figure 3:
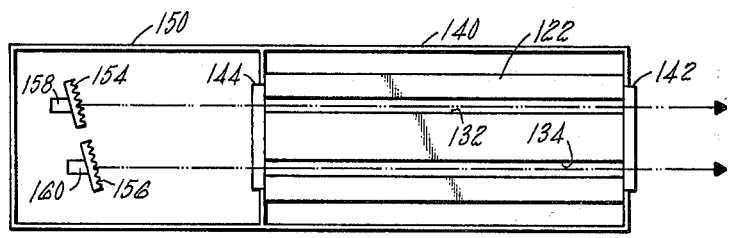
FIG. 3 illustrates a cross section of a pair of waveguide lasers, each waveguide having a separate diffraction grating.

FIG. 3 illustrates in cross section an alternative embodiment of the invention, in which separate gratings 154 and 156, controlled by separate piezoelectric transducers 158 and 160, determine the frequency of the two lasers. This embodiment eliminates the considerable alignment problem involved in setting one grating correctly for both channels, at the cost of less optical commonality.

Figure 4:
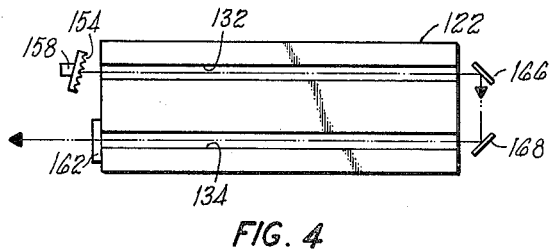
FIG. 4 illustrates a cross section of a pair of waveguides connected in series.

FIG. 4 illustrates in cross section another embodiment of the invention in which waveguides 132 and 134 are combined to form a single laser. The frequency is determined by grating 154 controlled by piezoelectric transducer 158 positioned at one end of waveguide 132. Mirrors 166 and 168 are oriented at 45° to the axis of the waveguides to reflect radiation into waveguide 134 from which it exits through output mirrors 162. This embodiment of the invention has the virtue that a certain optical length is contained within half the corresponding physical length, a feature that may be important when the volume allowed for the laser is a system constraint. The present invention also permits the use of a single power supply instead of two supplies or devices for electrically isolating the two discharges, thereby saving a corresponding amount of expense and complexity in the overall laser system.

The prior art '319 patent shows, without discussion, an electrode structure in which two cylindrical electrodes (44 and 46) are common to the two longitudinal discharge channels 36 and 38, with no indication of any means for isolating the two discharges. It is well known to those skilled in the art of DC laser gas discharges that when voltage (of the order of tens of kilovolts) is applied to two parallel gaseous discharge paths, one path will have more ionization than the other and will break down sooner. After breakdown, the voltage between the electrodes drops to a level determined by the relative magnitude of the discharge impedance and the power supply impedance. This lower voltage will be insufficient to initiate a discharge in the second channel, so that two discharges cannot be generated with any reasonable reliability.

No information is given in the '319 patent about the size, shape or extent of penetration into the discharge channels of electrodes 44 and 46, so that one skilled in the art would have no indication of what degree of isolation, if any, between channels 36 and 38 was provided. One skilled in the art, therefore, would not infer from this patent that it is possible to employ electrodes in common to two or more discharges.

One would expect that two transverse RF discharges would exhibit the same starting problem, but it has been found experimentally that two parallel RF discharges may be started reliably. When one discharge initiates first, the second discharge reliably may be struck by increasing the RF input power slightly (approximately 25%) momentarily. DC discharges, of course, do not exhibit this property. It is not understood why RF discharge have this unexpected property, it may be associated with the difference between the peak RF voltage and the plasma sustaining voltage.

A laser constructed according to the principles of the invention has a pair of square waveguides each having a cross sectional area of 2.25 mm squared, a length of 17 cm and operated at a pressure of approximately 70 Torr. The relative frequency stability of the twin oscillator device was measured to be approximately 30 KHz over a five second period.

We claim:

1. A waveguide laser system comprising:
   a ceramic member having a plurality of passages containing a gain medium fashioned therein;
   first and second electrodes disposed on opposite sides of said plurality of waveguide passages in said ceramic member for supplying power to said gain medium;
   means for resonating optical radiation in said gain medium;
   means for supplying radio-frequency power to said first and second electrodes so that each of said first and second electrodes supplies electromagnetic radiation to all of said plurality of passages.

2. A laser system according to claim 1, in which said first and second waveguide passages are bounded by said means for resonating optical radiation in such a manner that radiation of different frequencies may be resonated in each of said waveguide passages.

3. A laser system according to claim 1, in which at least two of said plurality of waveguide passages are connected serially, whereby said at least two waveguide passages form a combined gain medium for a single laser.

* * * * *